United States Patent
Franco et al.

(10) Patent No.: US 7,756,710 B2
(45) Date of Patent: Jul. 13, 2010

(54) METHOD AND APPARATUS FOR ERROR CORRECTION IN SPEECH RECOGNITION APPLICATIONS

(75) Inventors: Horacio Franco, Menlo Park, CA (US); Gregory Myers, San Francisco, CA (US); Jing Zheng, Sunnyvale, CA (US); Federico Cesari, Menlo Park, CA (US); Cregg Cowan, Mountain View, CA (US)

(73) Assignee: SRI International, Menlo Park, CA (US)

( * ) Notice: Subject to any disclaimer, the term of this patent is extended or adjusted under 35 U.S.C. 154(b) by 1021 days.

(21) Appl. No.: 11/486,266

(22) Filed: Jul. 13, 2006

(65) Prior Publication Data

US 2010/0125458 A1   May 20, 2010

(51) Int. Cl.
*G10L 15/22* (2006.01)
(52) U.S. Cl. .................................................. 704/255
(58) Field of Classification Search .................. 704/255
See application file for complete search history.

(56) References Cited

U.S. PATENT DOCUMENTS

| | | | |
|---|---|---|---|
| 5,983,177 A * | 11/1999 | Wu et al. | 704/244 |
| 6,868,383 B1 * | 3/2005 | Bangalore et al. | 704/254 |
| 6,925,154 B2 * | 8/2005 | Gao et al. | 379/88.03 |
| 7,240,003 B2 * | 7/2007 | Charlesworth et al. | 704/254 |
| 7,379,870 B1 * | 5/2008 | Belvin et al. | 704/255 |
| 7,529,665 B2 * | 5/2009 | Kim et al. | 704/236 |

\* cited by examiner

*Primary Examiner*—Susan McFadden

(57) ABSTRACT

In one embodiment, the present invention is a method and apparatus for error correction in speech recognition applications. In one embodiment, a method for recognizing user speech includes receiving a first utterance from the user, receiving a subsequent utterance from the user, and combining acoustic evidence from the first utterance with acoustic evidence from the subsequent utterance in order to recognize the first utterance. It is assumed that, if the first utterance has been incorrectly recognized on a first attempt, the user will repeat the first utterance (or at least the incorrectly recognized portion of the first utterance) in the subsequent utterance.

20 Claims, 3 Drawing Sheets

METHOD AND APPARATUS FOR ERROR CORRECTION IN SPEECH RECOGNITION APPLICATIONS

REFERENCE TO GOVERNMENT FUNDING

This invention was made with Government support under contract number DAAD19-01-2-0012 awarded by the U.S. Army. The Government has certain rights in this invention.

FIELD OF THE INVENTION

The present invention relates generally to speech recognition applications and relates more particularly to correcting errors in speech recognition systems.

BACKGROUND OF THE INVENTION

Speech recognition applications process utterances (input user speech) in order to recognize the words contained in the utterances. A speech recognition application may, for example, produce requested data in response to the content of an utterance, or may forward the text of the utterance to another application for further processing (e.g., data searching).

Conventional speech recognition applications, however, may encounter difficulties when attempting to recognize utterances, especially those containing multiple numerical digits (e.g., coordinates, account numbers, etc.). For example, background noise present at the time the utterance is made or speaker enunciation may affect a speech recognition application's ability to produce accurate results in a timely fashion; the speaker may be asked to repeat the problematic utterance one or more times until the speech recognition application successfully recognizes the utterance. This can be tedious and frustrating for the speaker.

Thus, there is a need in the art for a method and apparatus for error correction in speech recognition applications.

SUMMARY OF THE INVENTION

In one embodiment, the present invention is a method and apparatus for error correction in speech recognition applications. In one embodiment, a method for recognizing user speech includes receiving a first utterance from the user, receiving a subsequent utterance from the user, and combining acoustic evidence from the first utterance with acoustic evidence from the subsequent utterance in order to recognize the first utterance. It is assumed that, if the first utterance has been incorrectly recognized on a first attempt, the user will repeat the first utterance (or at least the incorrectly recognized portion of the first utterance) in the subsequent utterance.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to error correction for speech recognition applications. Embodiments of the invention exploit the fact that, when speech recognition is unsuccessful on the first attempt, a speaker will naturally repeat all or part of the same utterance in order to correct the recognition error. Thus, acoustic evidence (e.g., recognition hypotheses) for multiple instances of the same utterance may be combined in a manner that produces a better estimate of the utterance.

Figure 1:
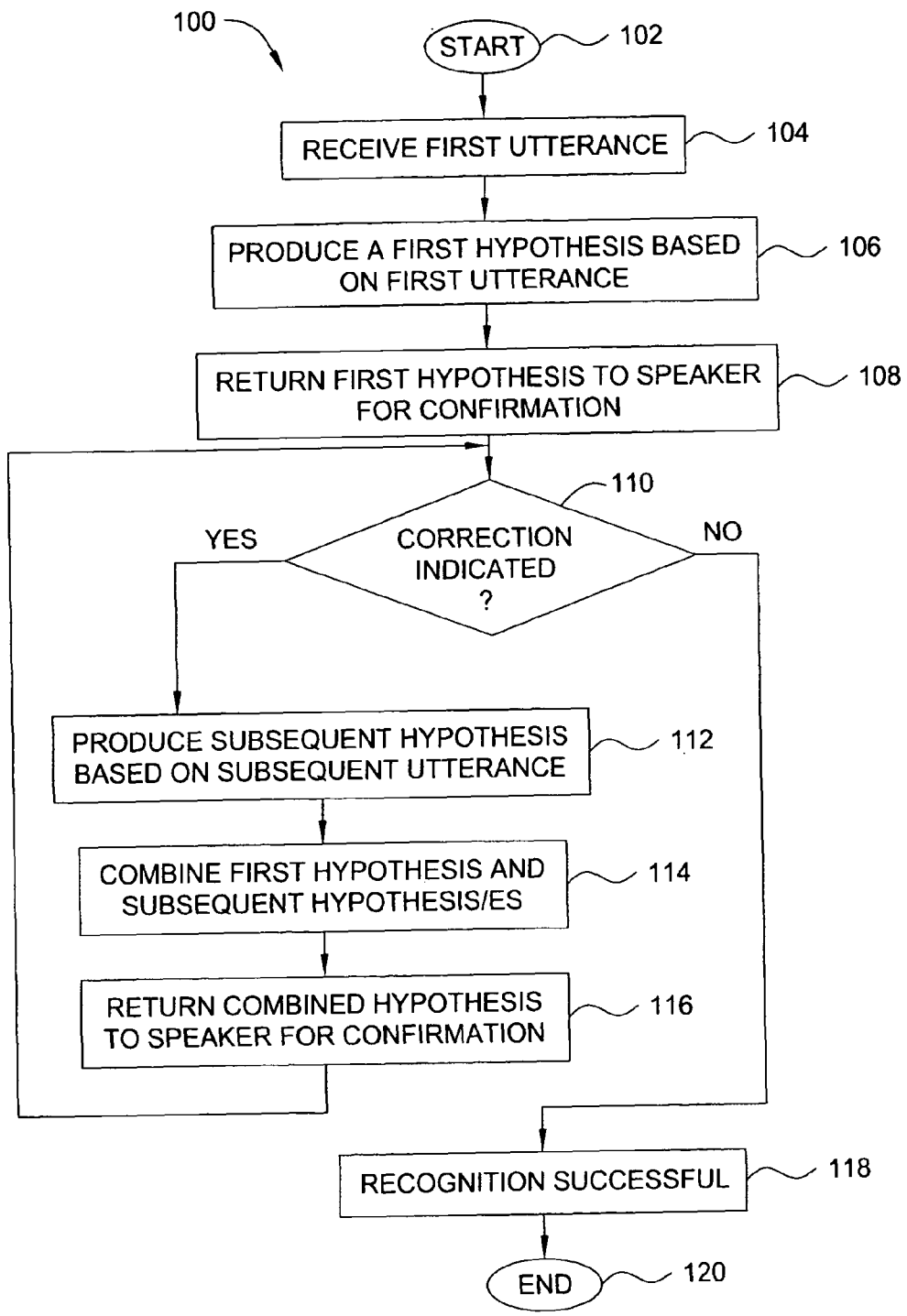
FIG. 1 is a flow diagram illustrating one embodiment of a method for correcting errors in a speech recognition process, according to the present invention.

FIG. 1 is a flow diagram illustrating one embodiment of a method 100 for correcting errors in a speech recognition process, according to the present invention. The method 100 is initialized at step 102 and proceeds to step 104, where the method 100 receives a first utterance (i.e., user speech to be recognized). For example, the first utterance might be a set of coordinates such as, "zone 52 north; 1 2 3 4 5 6 7 east; 1 2 3 4 5 6 7 north".

In step 106, the method 100 produces a first hypothesis (i.e., a proposed recognition solution) based on the first utterance. The first hypothesis represents the method 100's belief as to what was said in the first utterance. For example, based on the exemplary first utterance above, the method 100 might produce a first hypothesis such as, "zone 22 north; 1 2 3 4 5 9 7 east; 1 2 3 4 5 6 north", where errors in the first hypothesis might be attributable to background noise or speaker enunciation. In one embodiment, the first hypothesis is produced in accordance with one or more known speech recognition techniques. The method 100 returns the first hypothesis to the speaker (e.g., via a textual display or a speech synthesis interface) in step 108 for review/confirmation.

In step 110, the method 100 determines whether the speaker has indicated the need for a correction of the first hypothesis. In one embodiment, the need for a correction is indicated by a subsequent speaker utterance including a predefined keyword. In one embodiment, the subsequent utterance is received in response to the provision of the first hypothesis, which serves as a prompt for the speaker to provide the subsequent utterance. For example, a keyword such as "repeating" prefacing a subsequent utterance might indicate that the speaker is repeating an incorrectly recognized portion of the first utterance. Thus, based on the exemplary first utterance and first hypothesis discussed above, the method 100 might detect a subsequent ("correction") utterance such as, "repeating zone 52 north" or "repeating 1 2 3 4 5 6 7 east". The subsequent utterance(s) may repeat the entire first utterance, or may repeat only one or more portions of the first utterance that were incorrectly recognized in the first hypothesis.

If the method 100 determines in step 110 that no need for correction has been indicated, then the method 100 proceeds to step 118 and concludes that the recognition was successful (e.g., the first hypothesis accurately recognized the first utterance). The method 100 then terminates in step 120.

Alternatively, if the method 100 determines in step 110 that a need for correction has been indicated, the method 100 proceeds to step 112 and produces a subsequent hypothesis based on a subsequent utterance (e.g., a "correction" utterance). In one embodiment, the subsequent hypothesis is produced in accordance with one or more known speech recognition techniques. The method 100 then proceeds to step 114 and combines the first hypothesis with the subsequent hypothesis to form a combined hypothesis. In one embodiment, the method 100 specifically combines the respective acoustic scores of the first hypothesis and the subsequent hypothesis. In one embodiment, the respective acoustic scores are combined at the frame level (e.g., using a weighted combination of log observation probabilities). In another embodiment, the respective acoustic scores are combined at the re-scoring level (e.g., where either N-best or lattices from independent recognition attempts for each hypothesis are combined).

In one embodiment, the combined hypothesis may be produced on the basis of a single utterance that comprises a repeated phrase (including a keyword that indicates the repetition). In such an instance, the speaker essentially provides the "subsequent" utterance without an intervening prompt from the method 100. For example, the single utterance might comprise the phrase "The number is 1234. I repeat, the number is 1234". In this case, the method 100 would treat "The number is 1234" as the first utterance and "I repeat, the number is 1234" as the subsequent utterance, and combine respective first and subsequent hypotheses as described above to produce the combined hypothesis. Thus, there is no intervening prompt from the method 100 (e.g., such as providing the first hypothesis to the speaker).

In step 116, the method 100 returns the combined hypothesis to the speaker for review/confirmation. The method 100 then returns to step 110 as proceeds as described above in order to determine whether further correction to the combined hypothesis is necessary. The method 100 continues to combine hypotheses in an effort to correct recognition of the first utterance until recognition is determined to be successful (e.g., step 118).

The method 100 thereby achieves improved error correction for speech recognition applications. By assuming that a subsequent speaker utterance will comprise all or part of a previously spoken (and incorrectly recognized) utterance, the acoustic evidence from the previous and subsequent utterances can be combined in an efficient manner to produce a more accurate corrected recognition.

Figure 2:
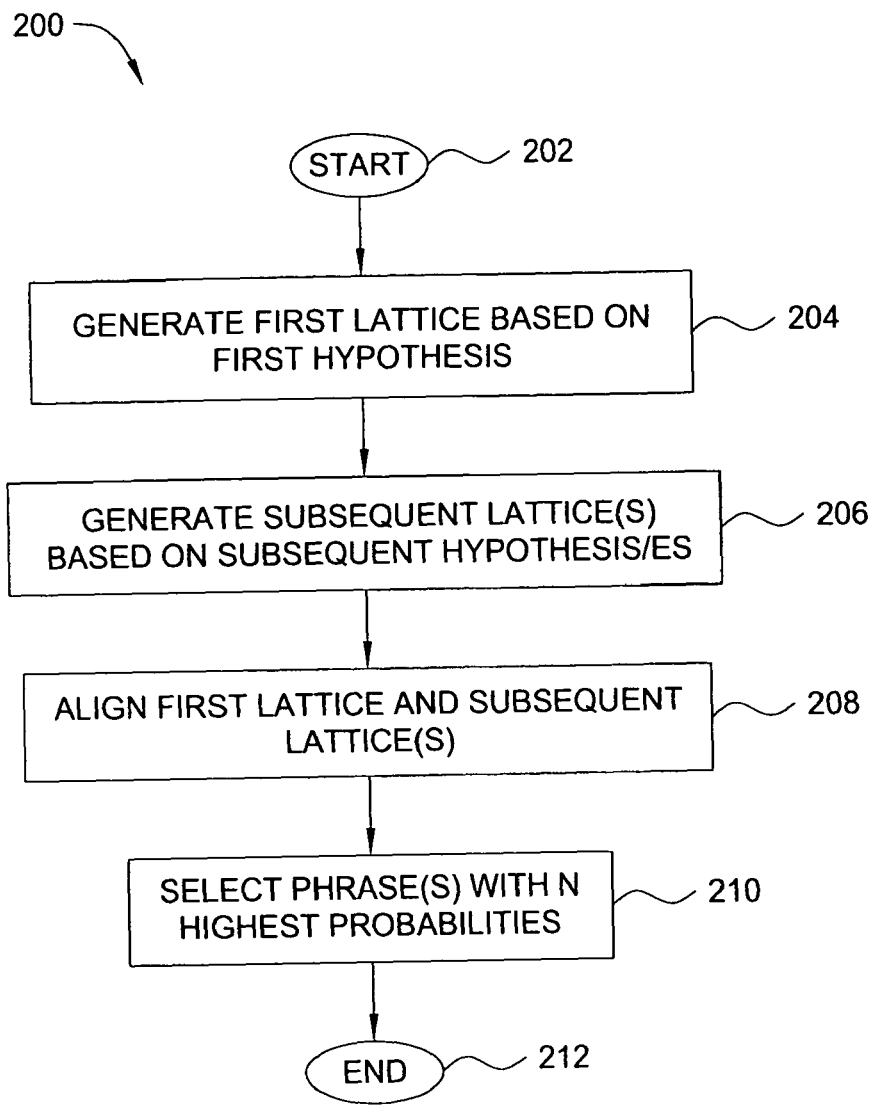
FIG. 2 is a flow diagram illustrating one embodiment of a method for combining hypotheses, according to the present invention.

FIG. 2 is a flow diagram illustrating one embodiment of a method 200 for combining hypotheses, according to the present invention. The method 200 may be implemented, for example, in connection with step 114 of the method 100 in order to combine the first hypothesis and a subsequent hypothesis.

The method 200 is initialized at step 202 and proceeds to step 204, where the method 200 generates a first word lattice based on the first hypothesis. The first word lattice is a network or diagram that graphically illustrates the first hypothesis. Specifically, the first lattice may be thought of as comprising a plurality of lattice positions or word "slots", where each slot corresponds to a temporal interval in the first utterance. Each slot is associated with one or more words that may potentially be have been uttered during the corresponding temporal interval. All of the slots in total comprise a phrase that may represent the first utterance (e.g., by selecting one word for each slot and then concatenating the selected words). Each potential word is associated with a score that indicates the probability that the word was in fact, uttered during the temporal interval corresponding to that slot. In one embodiment, a deletion may be the most probable word at one or more slots in the first word lattice. In fact, if the waveform representing the first utterance has a low signal-to-noise ratio, the first word lattice may include a plurality of slots whose most probable word is a deletion, due to multiple insertions with low probabilities. In one embodiment, a predefined deletion probability threshold is thus applied to remove deletions that are associated with probabilities above the threshold, in order to facilitate a subsequent alignment step, as described below with respect to step 208. In one embodiment, the deletion probability threshold is tuned experimentally.

In step 206, the method 200 generates a subsequent word lattice for the subsequent hypothesis. The subsequent word lattice is substantially similar to the first word lattice, but illustrates words and associated probabilities that comprise the subsequent hypothesis.

In step 208, the method 200 aligns the first word lattice and the subsequent word lattice to form an aligned word lattice. The aligned word lattice is a "compressed" representation of the first word lattice and the subsequent word lattice, where the probabilities for each word at each slot are combined. Thus, if the same word appears at the same slot in both the first word lattice and the subsequent word lattice, that word's associated probability is increased. Likewise, if a word appears at a given slot in the first word lattice, but does not appear at the corresponding slot in the subsequent word lattice, that word's associated probability is decreased. In one embodiment, the first word lattice and the subsequent word lattice are aligned in accordance with a Dynamic Programming Algorithm.

In one embodiment, alignment of the first word lattice and the subsequent word lattice includes removing any keywords in the subsequent word lattice that merely indicate a correction and are not part of the first utterance. For example, if the subsequent utterance is "repeating zone 52 north", the word "repeating" would be removed from the subsequent word lattice. In this embodiment, a null word is inserted at the slot for the removed word. In one embodiment, the probability associated with a deletion or an inserted null word is a predefined, experimentally tuned variable.

In step 210, the method 200 selects the phrase(s) with the N highest probabilities as the combined hypothesis/es to be presented to the speaker (e.g., in accordance with step 116 of the method 100). The probability of a phrase is the sum of the probabilities or scores of the individual words that comprise the phrase. In one embodiment, N is equal to one, such that the method 200 selects only the phrase with the highest probability of all. In another embodiment, N is greater than one, such that the method 200 selects a plurality of phrases having the highest probabilities. In another embodiment, if the phrase with the highest probability is identical to the first hypothesis, which the speaker has indicated as being incorrect, then the method 200 selects the phrase with the second highest probability as an alternative combined hypothesis. In another embodiment, the alternative combined hypothesis is formed by swapping the highest probability word for the next highest probability word at the slot having the smallest relative difference in probability between the highest probability word and the next highest probability word. The method 200 then terminates in step 212.

Figure 3:
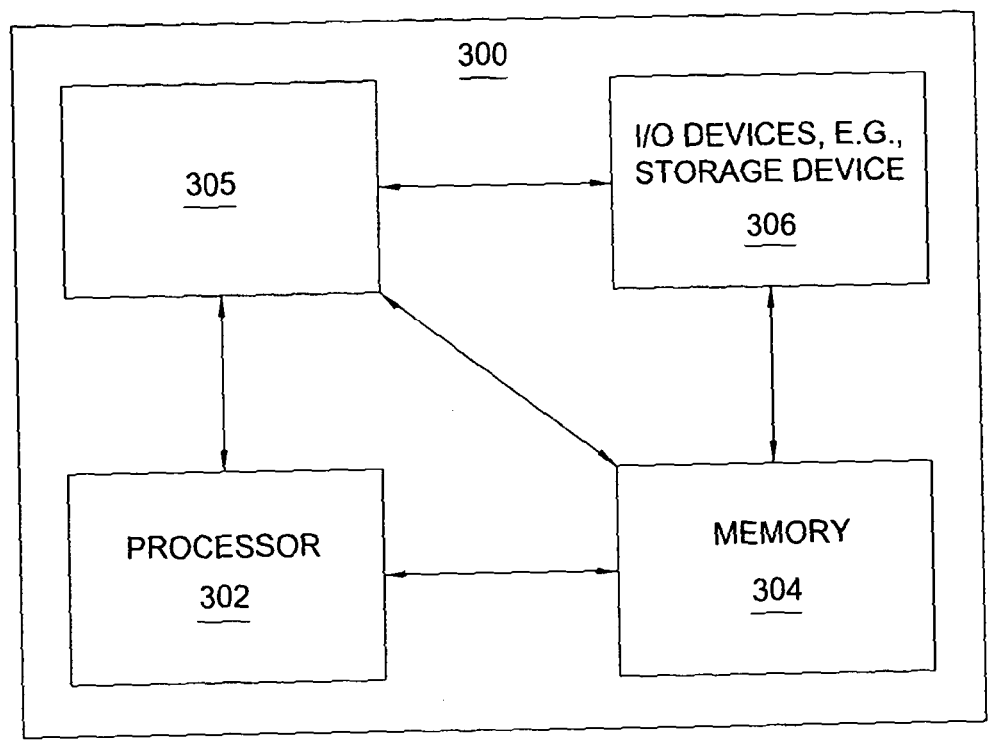
FIG. 3 is a high level block diagram of the error correction method that is implemented using a general purpose computing device.

FIG. 3 is a high level block diagram of the error correction method that is implemented using a general purpose computing device 300. In one embodiment, a general purpose computing device 300 comprises a processor 302, a memory 304, an error correction module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the route error correction module 305 can be implemented as a physical device or subsystem that is coupled to a processor through a communication channel.

Alternatively, the error correction module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the error correction module 305 for correcting recognition errors in speech recognition applications described herein with reference to the preceding Figures can be stored on a computer readable medium or carrier (e.g., RAM, magnetic or optical drive or diskette, and the like).

Thus, the present invention represents a significant advancement in the field of speech recognition applications. Embodiments of the invention exploit the fact that, when speech recognition is unsuccessful on the first attempt, a speaker will naturally repeat all or part of the same utterance in order to correct the recognition error. Thus, recognition results for multiple instances of the same utterance may be combined in a manner that produces a better estimate of the utterance.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for recognizing user speech, the method comprising:
    receiving a first utterance from said user;
    receiving a subsequent utterance from said user, wherein said subsequent utterance comprises at least one pre-defined keyword that indicates that acoustic evidence from said first utterance should be combined with acoustic evidence from said subsequent utterance; and
    combining said acoustic evidence from said first utterance with said acoustic evidence from said subsequent utterance in order to recognize said first utterance,
    wherein at least one of said: receiving said first utterance, said receiving said subsequent utterance, or said combining is performed using a processor.

2. The method of claim 1, wherein said subsequent utterance comprises at least a portion of said first utterance.

3. The method of claim 1, further comprising:
    providing a recognition result produced for said first utterance to said user.

4. The method of claim 1, wherein said at least one pre-defined keyword is replaced with a null word in a word lattice associated with said subsequent utterance.

5. The method of claim 1, wherein said acoustic evidence from said first utterance comprises a first word lattice and said acoustic evidence from said subsequent utterance comprises a subsequent word lattice, each of said first word lattice and said subsequent word lattice comprising:
    a plurality of lattice positions, each of said plurality of lattice positions corresponding to a temporal interval in said first utterance or in said subsequent utterance;
    at each of said plurality of lattice positions, one or more words that are believed to have been uttered during the temporal interval; and
    at each of said one or more words, a probability score that indicates a likelihood that an associated one of the one or more words was uttered during the temporal interval.

6. The method of claim 5, wherein said combining comprises:
    aligning said first word lattice with said subsequent word lattice to form an aligned word lattice; and
    selecting at least one phrase from said aligned word lattice as a recognition result corresponding to said first utterance.

7. The method of claim 6, wherein said aligned word lattice comprises:
    a plurality of aligned lattice positions, each of the plurality of aligned lattice positions corresponding to a given lattice position in at least one of: said first word lattice or said subsequent word lattice;
    at each of said plurality of aligned lattice positions, at least one word, said at least one word comprising: each of said one or more words associated with the given lattice position in the first word lattice and each of said one or more words associated with the given lattice position in the subsequent word lattice; and
    at said at least one word, a combined probability score that comprises a combination of: the probability score associated with the at least one word at the given lattice position in the first word lattice and the probability score associated with the at least one word at the given lattice position in the subsequent word lattice.

8. The method of claim 7, wherein said selecting comprises:
    identifying at least one phrase in said aligned word lattice having a highest combined probability score.

9. The method of claim 8, wherein said identifying comprises:
    identifying, at each of said plurality of aligned lattice positions, an associated word having a highest combined probability score; and
    concatenating words identified at each of said plurality of aligned lattice positions to form said at least one phrase.

10. The method of claim 7, further comprising:
    identifying, in at least one of said first word lattice and said subsequent word lattice, one or more deletions at one or more of said plurality of lattice positions; and
    removing deletions associated with probability scores that exceed a predefined probability threshold.

11. An apparatus for recognizing user speech, comprising:
    means for receiving a first utterance from a user;
    means for receiving a subsequent utterance from said user, wherein said subsequent utterance comprises at least one pre-defined keyword that indicates that acoustic evidence from said first utterance should be combined with acoustic evidence from said subsequent utterance; and
    means for combining said acoustic evidence from said first utterance with said acoustic evidence from said subsequent utterance in order to recognize said first utterance.

12. A computer readable medium containing an executable program for recognizing user speech, where the program performs steps of:
    receiving a first utterance from said user;
    receiving a subsequent utterance from said user, wherein said subsequent utterance comprises at least one pre-defined keyword that indicates that acoustic evidence from said first utterance should be combined with acoustic evidence from said subsequent utterance; and
    combining said acoustic evidence from said first utterance with said acoustic evidence from said subsequent utterance in order to recognize said first utterance.

13. The computer readable medium of claim 12, wherein said subsequent utterance comprises at least a portion of said first utterance.

14. The computer readable medium of claim 12, further comprising:
    providing a recognition result produced for said first utterance to said user.

15. The computer readable medium of claim 12, wherein said at least one pre-defined keyword is replaced with a null word in a word lattice associated with said subsequent utterance.

16. The computer readable medium of claim 12, wherein said acoustic evidence from said first utterance comprises a first word lattice and said acoustic evidence from said subsequent utterance comprises a subsequent word lattice, each of said first word lattice and said subsequent word lattice comprising:
- a plurality of lattice positions, each of said plurality of lattice position positions corresponding to a temporal interval in said first utterance or in said subsequent utterance;
- at each of said plurality of lattice positions, one or more words that are believed to have been uttered during the temporal interval; and
- at each of said one or more words, a probability score that indicates a likelihood that an associated one of the one or more words was uttered during the temporal interval.

17. The computer readable medium of claim 16, wherein said combining comprises:
- aligning said first word lattice with said subsequent word lattice to form an aligned word lattice; and
- selecting at least one phrase from said aligned word lattice as a recognition result corresponding to said first utterance.

18. The computer readable medium of claim 17, wherein said aligned word lattice comprises:
- a plurality of aligned lattice positions, each of the plurality of aligned lattice positions corresponding to a given lattice position in at least one of: said first word lattice or said subsequent word lattice;
- at each of said plurality of aligned lattice positions, at least one word, said at least one word comprising: each of said one or more words associated with the given lattice position in the first word lattice and each of said one or more words associated with the given lattice position in the subsequent word lattice; and
- at said at least one word, a combined probability score that comprises a combination of: the probability score associated with the at least one word at the given lattice position in the first word lattice and the probability score associated with the at least one word at the given lattice position in the subsequent word lattice.

19. The computer readable medium of claim 18, wherein said selecting comprises:
- identifying, at each of said plurality of aligned lattice positions, an associated word having a highest combined probability score; and
- concatenating words identified at each of said plurality of aligned lattice positions to form said at least one phrase.

20. The computer readable medium of claim 18, further comprising:
- identifying, in at least one of said first word lattice and said subsequent word lattice, one or more deletions at one or more of said plurality of lattice positions; and
- removing deletions associated with probability scores that exceed a predefined probability threshold.

* * * * *